United States Patent
Wingett et al.

(10) Patent No.: US 6,882,072 B2
(45) Date of Patent: Apr. 19, 2005

(54) ENERGY STORAGE FLYWHEEL SYSTEM WITH A POWER CONNECTOR THAT INTEGRALLY MOUNTS ONE OR MORE CONTROLLER CIRCUITS

(75) Inventors: Paul T. Wingett, Mesa, AZ (US); Calvin C. Potter, Mesa, AZ (US); Todd R. Giles, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/461,537

(22) Filed: Jun. 13, 2003

(65) Prior Publication Data
US 2004/0251753 A1 Dec. 16, 2004

(51) Int. Cl.$^7$ ................................................ H02K 7/02
(52) U.S. Cl. ............................. 310/74; 310/89; 310/71
(58) Field of Search ........................... 310/74, 71, 89, 310/68 R; 74/572, 574

(56) References Cited

U.S. PATENT DOCUMENTS

| | | | |
|---|---|---|---|
| 4,224,543 A | 9/1980 | Morreale | |
| 4,484,116 A | * 11/1984 | Ellicott et al. | 388/816 |
| 4,529,900 A | 7/1985 | Uzuka | |
| 4,623,320 A | 11/1986 | Kakizaki et al. | |
| 4,700,094 A | * 10/1987 | Downer et al. | 310/90.5 |
| 4,800,307 A | 1/1989 | Papst | |
| 4,937,482 A | 6/1990 | Dohogne | |
| 5,357,160 A | 10/1994 | Kaneda et al. | |
| 5,398,571 A | * 3/1995 | Lewis | 74/572 |
| 5,610,458 A | 3/1997 | Baker et al. | |
| 5,629,574 A | 5/1997 | Cognetti et al. | |
| 6,021,043 A | 2/2000 | Horng | |
| 6,048,219 A | 4/2000 | Kotowski | |
| 6,175,172 B1 | * 1/2001 | Bakholdin et al. | 310/74 |
| 6,400,058 B1 | 6/2002 | Liau | |
| 6,476,529 B1 | 11/2002 | Tilbor | |

* cited by examiner

Primary Examiner—Thanh Lam
(74) Attorney, Agent, or Firm—Douglas A. Mullen, Esq.

(57) ABSTRACT

An energy storage flywheel system that includes a power connector extending through the flywheel housing assembly and is hermetically sealed thereto. A circuit board, on which is mounted at least a motor/controller circuit, is coupled to the power connector adjacent to the flywheel housing assembly.

28 Claims, 8 Drawing Sheets

ENERGY STORAGE FLYWHEEL SYSTEM WITH A POWER CONNECTOR THAT INTEGRALLY MOUNTS ONE OR MORE CONTROLLER CIRCUITS

FIELD OF THE INVENTION

The present invention relates to electrical power generation systems and, more particularly, to a system of electrical power generation and storage that has one or more flywheels and that can be used in space, vehicle, or terrestrial applications.

BACKGROUND OF THE INVENTION

Many satellites and other space vehicles, as well as some terrestrial vehicle applications, such as seagoing vessels, include a main source of electrical power and a standby, or backup, source of electrical power. The main source of electrical power may include one or more photovoltaic arrays, in the case of a satellite, or one or more engine-driven or turbine-driven generators, in the case of seagoing vessels. The standby electrical power source may include a battery, and may additionally include one or more energy storage flywheels, and/or one or more separate engine-driven or turbine-driven generators.

In systems that include one or more energy storage flywheels, the energy storage flywheels may each include a motor/generator. A motor/generator is an electrical machine that may be operated in a motor mode or a generator mode. In the motor mode, the motor/generator converts electrical energy to mechanical energy, and in the generator mode, the motor/generator converts mechanical energy to electrical energy. In the context of an energy storage flywheel system, the system may include a rotationally mounted flywheel that is coupled to the motor/generator. Thus, the motor/generator may be operated in the motor mode to spin up the flywheel and store energy therein. The motor/generator may also be operated in the generator mode to convert the stored energy in the flywheel to electrical energy.

Typically, the operation of the motor/generator in an energy storage flywheel system is controlled by a motor/generator controller. In most instances the motor/generator controller is located remote from the flywheel. Thus, the power cables that electrically couple the motor/generator to the controller may need to traverse some distance external to the flywheel system housing. Power cables can be a source of unwanted electromagnetic interference (EMI) to some circuit components, and can also be an unwanted source of weight. Moreover, the power cables may then need to be electrically coupled to the controller, which can in some instances be time consuming and costly.

Hence, there is a need for an energy storage flywheel system that addresses one or more of the drawbacks noted above. Namely, a system that reduces the length of power cables, which thereby reduces system weight and EMI emissions, and/or that alleviates the need to conduct time consuming electrical connections of the power cables to the controller circuits. The present invention addresses one or more of these drawbacks.

SUMMARY OF THE INVENTION

The present invention provides power connector and circuit board configuration that allows at least a motor/generator controller circuit to be mounted on the housing of an energy storage flywheel system. The power connector and circuit board together reduce power cable length and/or alleviate the need to conduct time consuming electrical connections to the motor/generator controller circuit.

In one embodiment, and by way of example only, an energy storage flywheel system includes a housing assembly, an energy storage flywheel, a power connector, and a controller circuit. The energy storage flywheel is rotationally mounted in the housing assembly. The power connector extends through the housing assembly. The controller circuit is mounted on the housing assembly and is electrically coupled to the power connector.

In another exemplary embodiment, a power connector adapted for mounting on an energy storage flywheel system housing includes a main body, an electrical feedthrough, and one or more circuit board mounts. The main body is adapted to extend at least partially through the energy storage flywheel housing. The electrical feedthrough is formed in the main body, and has one or more electrical conductors extending therethrough. Each circuit board mounts extends from the main body, and is adapted to couple to a printed circuit board.

In yet another exemplary embodiment, a circuit card adapted to mount on an energy storage flywheel housing that has one or more structural fins includes a main body and a plurality of slots. The main body has a first surface, a second surface, and a plurality of side surfaces that are disposed between the first and second surface. The slots are formed in the main body, and each slot extends between the first and second surfaces, and further extends from a first one of the side surfaces a predetermined distance toward a second one of the side surfaces that is disposed opposite the first side surface. Each slot is dimensioned to at least partially surround a section of one of the structural fins on the energy storage flywheel housing.

Other independent features and advantages of the preferred flywheel system, power connector, and circuit board will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in an energy storage flywheel system in a satellite, it will be appreciated that it can be implemented in others systems and environments, both terrestrial and extraterrestrial including, for example, land-based power systems and power systems on sea-going vessels such as surface ships and submarines.

Figure 1:
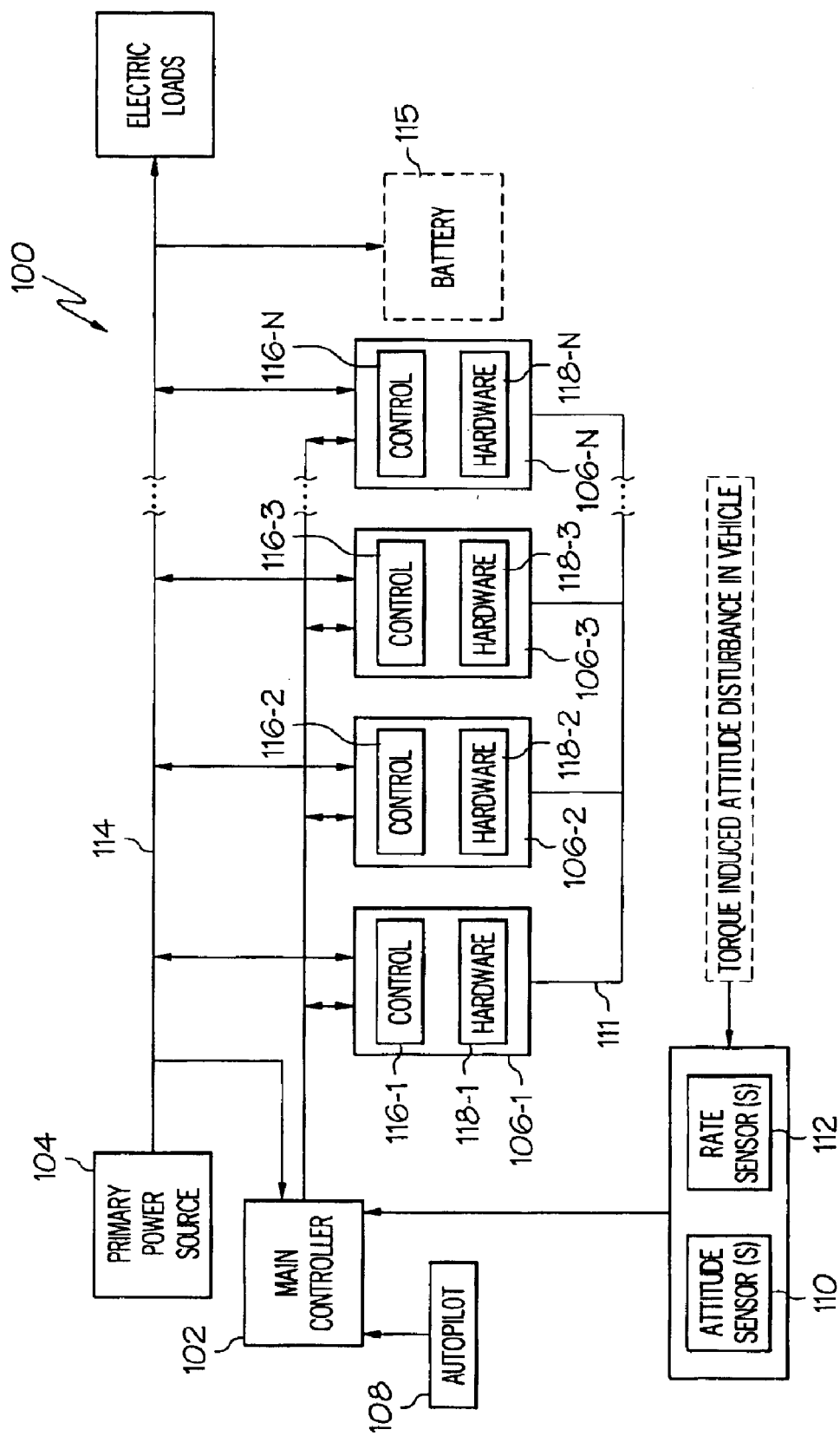
FIG. 1 is a functional block diagram of an exemplary embodiment of a power and attitude control system for a spacecraft.
Figure 2:
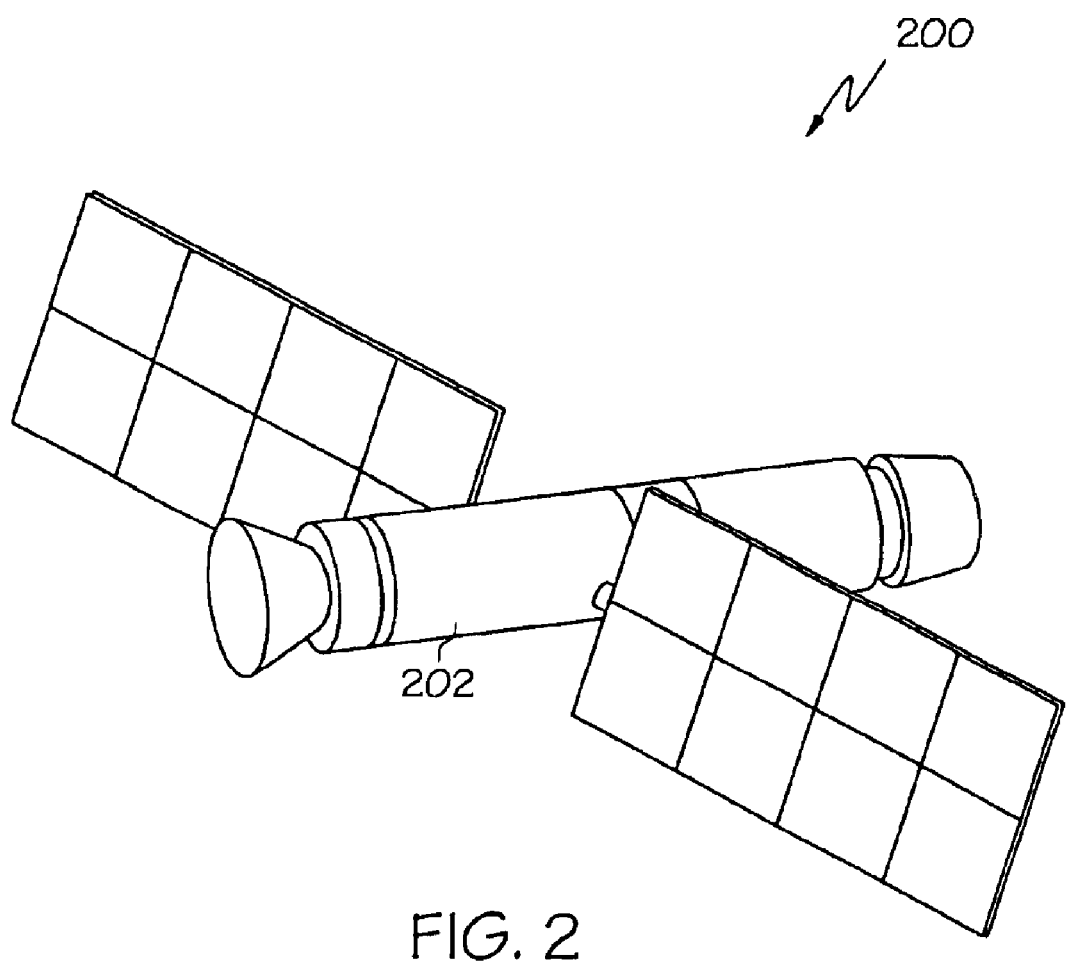
FIG. 2 is a perspective view of a physical embodiment of a satellite system that may incorporate the system of FIG. 1.

Turning now to the description and with reference first to FIG. 1, a functional block diagram of an exemplary power and attitude control system 100 for a spacecraft is shown. The system 100 includes a main controller 102, a primary power source 104, and a plurality of flywheel systems 106 (106-1, 106-2, 106-3, . . . 106-N). A perspective view of an exemplary physical embodiment of a spacecraft 200 that may use the system 100 is illustrated in FIG. 2.

The main controller 102 receives attitude commands (or torque commands) from, for example, an earthbound station or its onboard autopilot 108, and monitors the electrical power distribution system 114, and appropriately controls the operation of the flywheels 106. In response to the torque commands, the flywheels 106 are controlled to induce appropriate attitude disturbances in the spacecraft, and thereby control spacecraft attitude. In addition, depending upon the state of the electrical distribution system 114, the flywheels 106 are controlled to either supply electrical energy to, or draw electrical energy from, the electrical distribution system. One or more spacecraft dynamic sensors, such as one or more attitude sensors 110 and one or more rate sensors 112, sense spacecraft attitude and attitude rate-of-change, respectively, and supply feedback signals representative thereof to the main controller 102. A more detailed description of the main controller 102 and the process it implements to control power and attitude is provided further below.

The primary power source 104, as its name connotes, is the primary source of electrical power to the electrical power distribution system 1114. In the depicted embodiment, in which the system 100 is implemented in a spacecraft, the primary power source 104 is one or more solar panels, each of which includes an array of solar cells to convert light energy into electrical energy. The solar panels 104 may be attached to the satellite itself or to fixed or moveable structures that extend from the satellite. When the spacecraft 200 is positioned such that it does not receive sunlight, such as, for example, when it is in the Earth's shadow, a backup electrical power source is needed. As was alluded to above, in addition to providing attitude control, the flywheel systems 106 also function as a backup power source. The flywheel systems 106 may also provide electrical power if the power demanded by the electrical loads exceeds the capacity of the primary power source 104. It will be appreciated that another backup power source, such as a battery 114 (shown in phantom in FIG. 1), may also be provided.

The system 100 includes N number of energy storage flywheel systems 106 (106-1, 106-2, 106-3, . . . 1-6-N). The system 100 is preferably configured so that some of the flywheel systems 106 are active, while one or more of the remaining flywheel systems 106 is in a standby, inactivated state. Thus, the system 100 is at least single fault tolerant. The number of flywheel systems 106 that are active may vary, depending on system requirements. As will be discussed more fully below, in a particular preferred embodiment, four flywheel systems 106 are active and the remaining are inactive.

Figure 3:
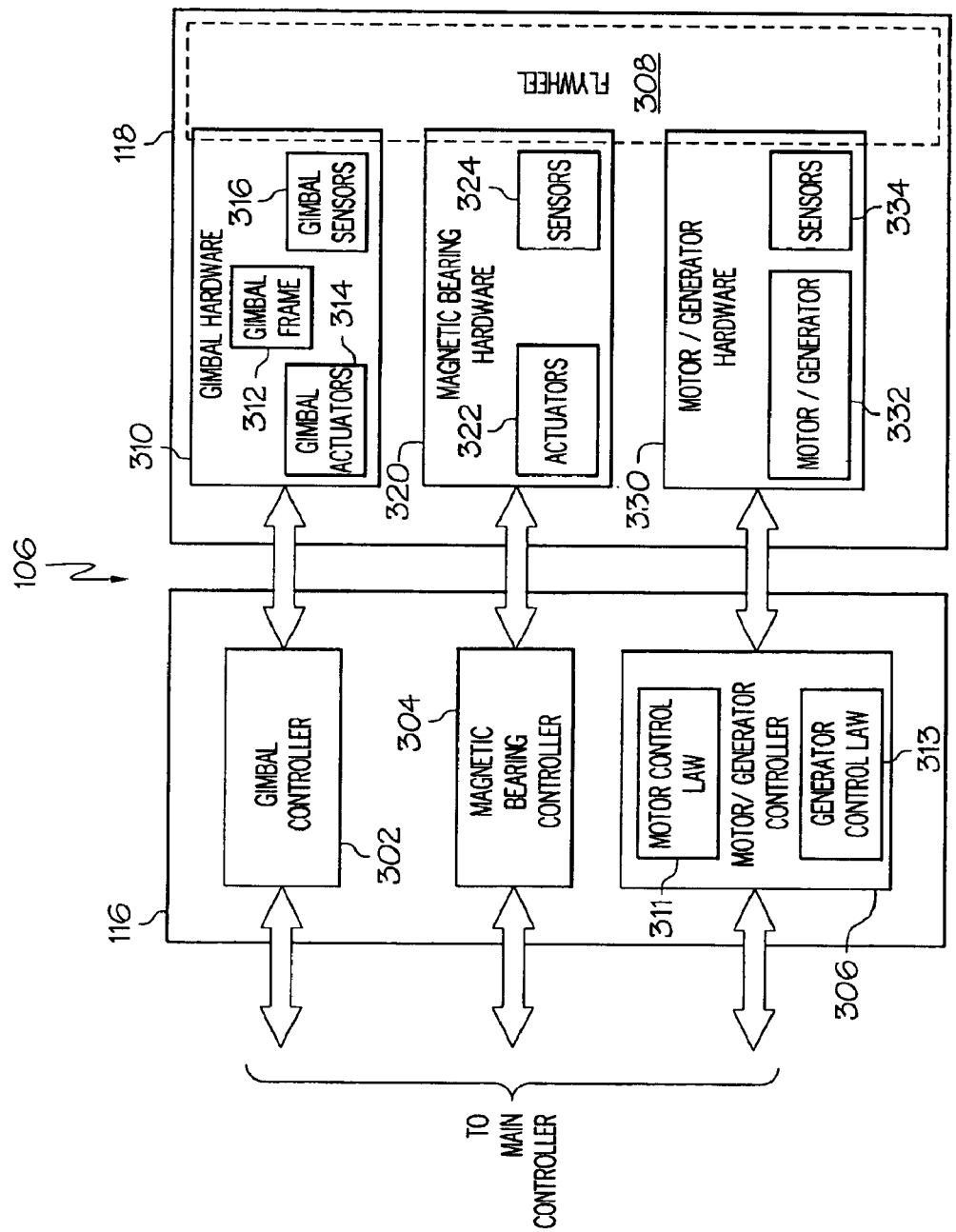
FIG. 3 is a functional block diagram of an exemplary embodiment of one energy storage flywheel system that may be used in the system of FIG. 1.

The flywheel systems 106 each include a flywheel control module 116 (116-1, 116-2, 116-3, . . . 116-N) and flywheel hardware 118 (118-1, 118-2, 118-3, . . . 118-N). The flywheel control modules 116 are each in operable communication with the main controller 102 and, in the depicted embodiment, are in communication with one another via a data bus 111. The main controller 102, as was noted above, supplies attitude control commands to the each of the flywheel control modules 116. In turn, the flywheel control modules 116 control the relative attitudes and angular velocities of the associated flywheel hardware 118 to effect attitude control of the spacecraft 200. The flywheel control modules 116 also respond to commands from the main controller 102 to control the operation of the associated flywheel hardware 118 in either a motor mode or a generator mode, and the rotational acceleration of the associated flywheel hardware 118 in each mode. The flywheel control modules 116, as is discussed in more detail below, also monitor various parameters of the associated flywheel hardware 118, and supply representative signals to the main controller 102. A block diagram of an exemplary embodiment one flywheel system 106 is illustrated in FIG. 3, and will now be discussed in detail.

The flywheel control modules 116 each include three separate controllers, a gimbal controller 302, a magnetic bearing controller 304, and a motor/generator controller 306. The flywheel hardware modules 118 each include an energy storage flywheel 308, gimbal hardware 310, magnetic bearing hardware 320, and motor/generator hardware 330. The gimbal controller 302 receives gimbal angle velocity commands from the main controller 102, and supplies appropriate control signals to, and receives various feedback signals from, the gimbal hardware 310, to effect attitude control. At least some of the feedback signals the gimbal controller 310 receives are representative of the gimbal hardware 310 response to the supplied control signals. The gimbal controller 302 also supplies these feedback signals to the main controller 102.

In the depicted embodiment, the gimbal hardware 310 is a gimbal frame that includes one or more gimbal assemblies 312, one or more gimbal actuators 314, and one or more gimbal sensors 316. The flywheel 308 is rotationally mounted in the gimbal frame 310, about a gimbal axis, via the gimbal assemblies 312. The gimbal axis is perpendicular to the spin axis of the energy storage flywheel 308. The gimbal actuator 314 is coupled to the gimbal frame 310, and is also coupled to receive the control signals from the gimbal controller 302. As is generally known, attitude control in a spacecraft may be implemented by changing the gimbal angles at certain rates (e.g., angular velocities). Thus, in response to the commands received from the main controller 102, the gimbal controller 302 supplies appropriate control signals to the gimbal actuators 314. In response to these control signals, the gimbal actuators appropriately position the flywheel 308 with respect to the gimbal frame 310 at the appropriate angular velocities. The gimbal sensors 316 include sensors that can sense at least the position and rate of the flywheel with respect to the gimbal frame 310, and supply position and rate feedback signals to the gimbal controller 302 and to the main controller 102.

The magnetic bearing controller 304 may also receive one or more commands from the main controller 102. The magnetic bearing controller 304, in accordance with a control law, supplies appropriate command signals to, and receives various feedback signals from, the magnetic bearing hardware 320. At least some of the feedback signals received by the magnetic bearing controller 304 are representative of the magnetic bearing hardware 320 response to the supplied control signals. Similar to the gimbal controller 302, the magnetic bearing controller 304 may supply one or more of the feedback signals it receives to the main controller 102.

The magnetic bearing hardware 320 functions to rotationally mount or levitate, in non-contact fashion, the energy storage flywheel 106. In the depicted embodiment, the magnetic bearing hardware 320 implements active magnetic bearings, and includes electromagnetic actuators 322 and position sensors 324, and could additionally include speed sensors (not illustrated). The position sensors 324 sense the position of the flywheel rotor (not illustrated) and supply appropriate position signals to the magnetic hearing controller 304. The magnetic bearing controller 304, in accordance with the control law, supplies the appropriate current magnitude to the electromagnetic actuators 322, which in turn generate magnetic forces of the appropriate magnitude to appropriately position the flywheel rotor. As FIG. 3 also depicts, the magnetic bearing hardware 320 may include one or more temperature sensors 326. Although active magnetic bearings are shown in FIG. 3, it will be appreciated that the magnetic bearing hardware 320 could be configured to implement passive magnetic bearings, or non-magnetic rolling element bearings.

The motor/generator controller 306 receives a signal representative of the bus voltage of the spacecraft electrical distribution system 114 and, in response, configures the motor/generator hardware 330 to operate as either a motor or a generator. The motor/generator controller 302 also receives commands from the main controller 102 and, in response, controls the rotational acceleration of the motor/generator and thus the flywheel 308. To do so, the motor/generator controller 306 is configured to selectively implement either a motor control law 311 or a generator control law 313. The motor/generator controller 306 also receives various feedback signals from the motor/generator hardware 330. At least some of the feedback signals received by the motor/generator controller 306 are representative of the motor/generator hardware 330 response to the supplied control signals. The motor/generator controller 306 supplies one or more of the feedback signals it receives from the motor/generator hardware 330 to the main controller 102.

The motor/generator hardware 330 includes a motor/generator 332 and one or more sensors 334. The motor/generator 332 may be any one of numerous motor/generator sets known now, or in the future, and includes a main rotor that is coupled to the rotor of the flywheel 308. The sensors 334 include one or more temperature sensors and one or more commutation sensors. When the bus voltage of the electrical distribution system 10 is sufficiently high, the motor/generator controller 306 implements the motor control law 311 and the motor/generator 332 is operated as a motor. During operation as a motor, the motor/generator 332 spins up the flywheel 308, to store rotational kinetic energy. Conversely, when the bus voltage of the electrical distribution system 10 drops to some predetermined magnitude, the motor/generator controller 306 implements the generator control law 313 and the motor/generator 332 is operated as a generator. During its operation as a generator, the motor/generator 332 spins down the flywheel 308, converting the flywheel's stored rotational kinetic energy to electrical energy. As was previously discussed, changes in the rotational speed of the flywheel 308 can impact the attitude of the spacecraft. Thus, in both the motor mode and generator mode, the flywheel 308 is spun up, or spun down, to a rotational velocity at an acceleration commanded by the main controller 102.

Figure 4:
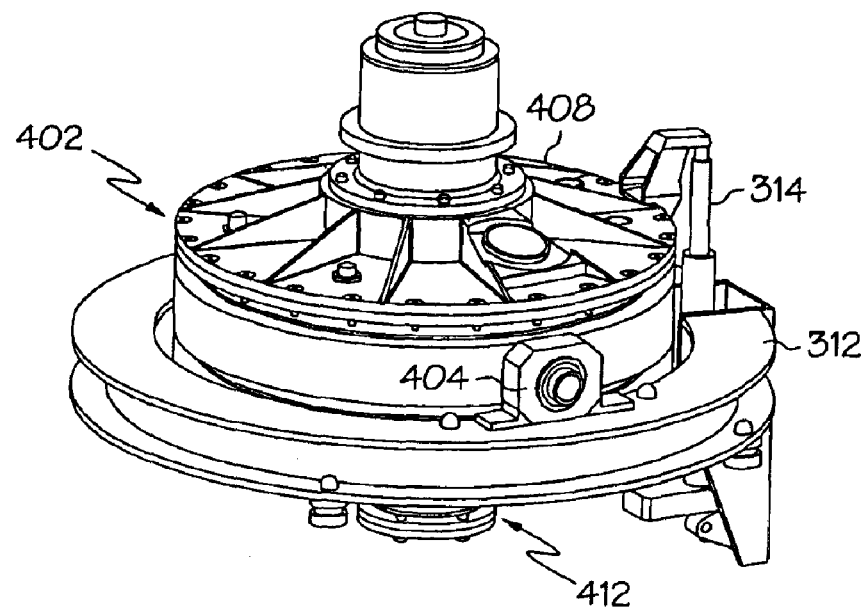
FIGS. 4 and 5 are perspective and cross section views, respectively, of a physical embodiment of the energy storage flywheel system of FIG. 3.
Figure 5:
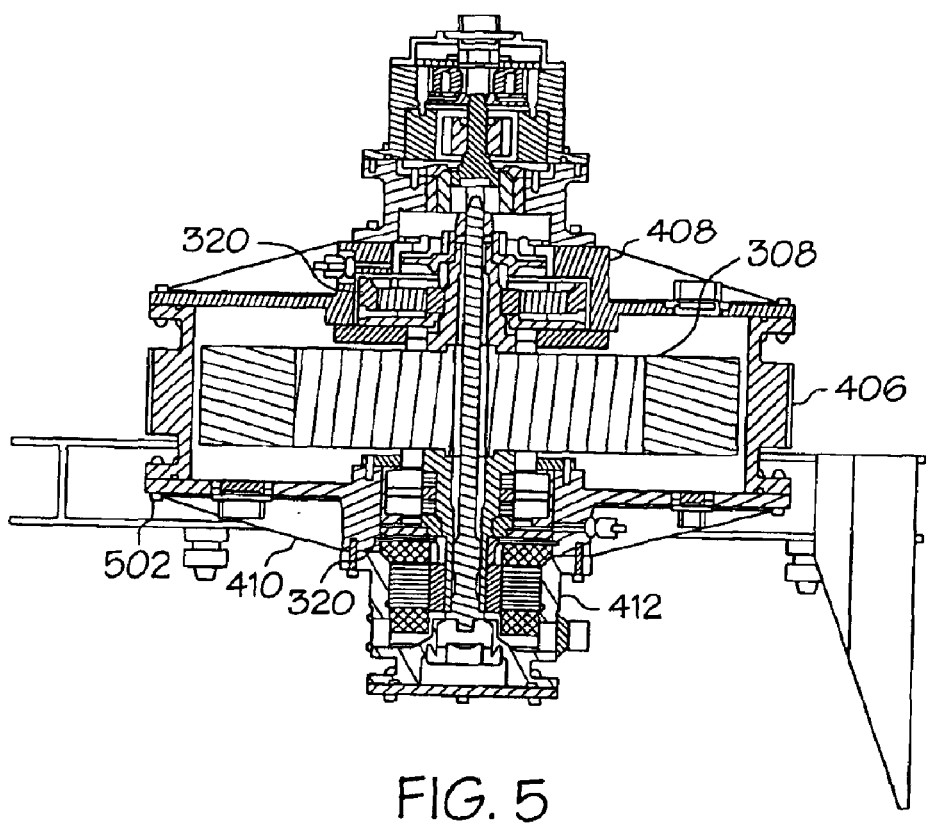

Turning now to FIGS. 4–9, an exemplary physical embodiment of an energy storage flywheel system 106 will now be described. With reference first to FIGS. 4 and 5, it is seen that the exemplary flywheel system 106 includes a housing assembly 402, which is rotationally mounted in the gimbal frame 312 via two gimbal bearings 404 (only one shown). A single gimbal actuator 314 is mounted on the gimbal frame 312 and, as was noted above, receives control signals from the gimbal controller 302 (not shown in FIGS. 4 and 5) to position the housing assembly 402 at the appropriate angular velocities, to thereby effect attitude control.

The housing assembly 402 includes a central section 406, and two end sections, a first end section 408 and a second end section 410, and a motor/generator housing 412. The motor/generator housing 412 is coupled to the housing assembly second end section 410. The motor/generator 332 stator is mounted in the motor/generator housing 412 and the motor/generator 332 rotor is coupled to the flywheel 308, which is rotationally mounted in the housing assembly 402 via two sets of the magnetic bearing hardware 310. Although the housing assembly 402 is depicted as being constructed of numerous sections that are coupled together, it will be appreciated that it could be formed as an integral structure.

Figure 6:
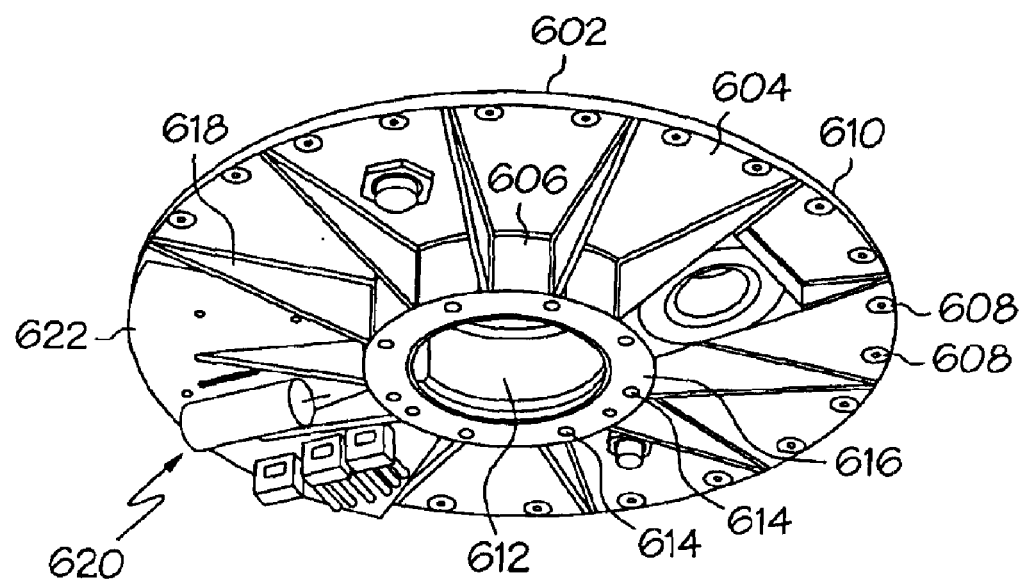
FIG. 6 is a perspective view of an end section of an energy storage flywheel system housing used in the system of FIG. 4.
Figure 7:
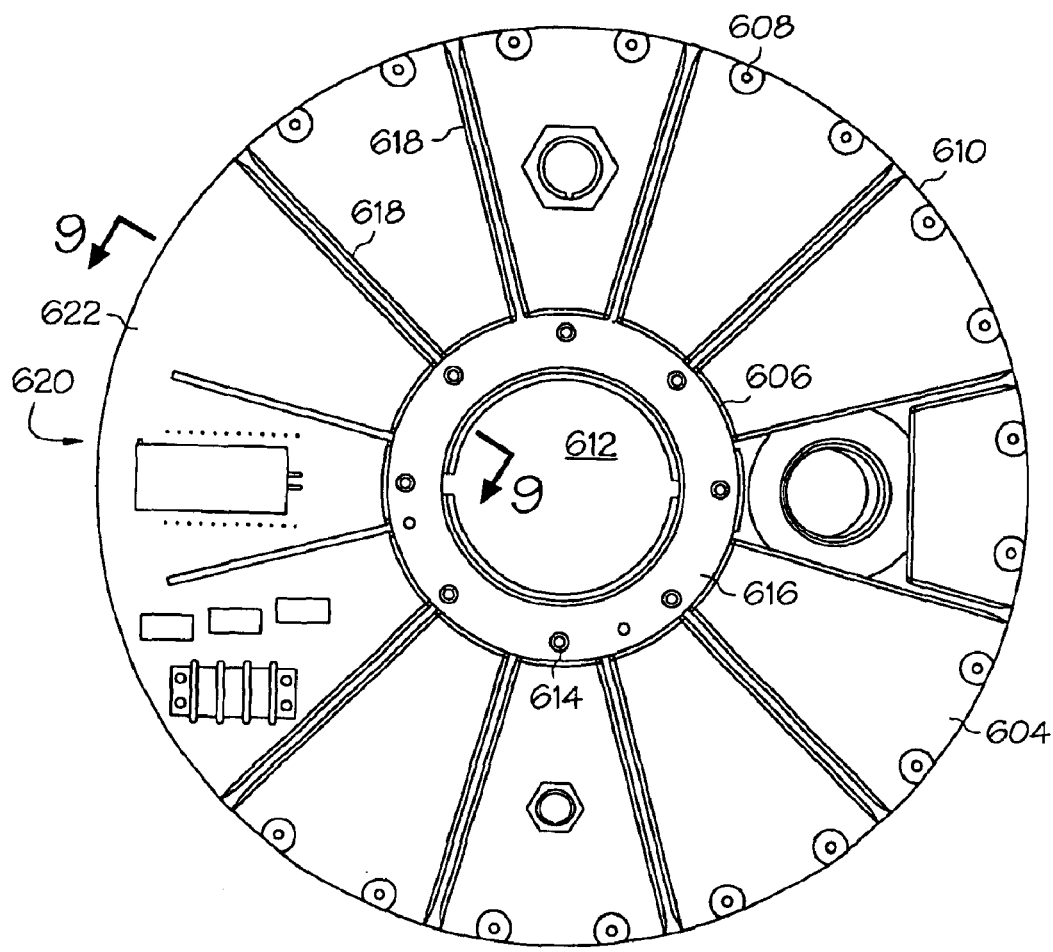
Figure 8:
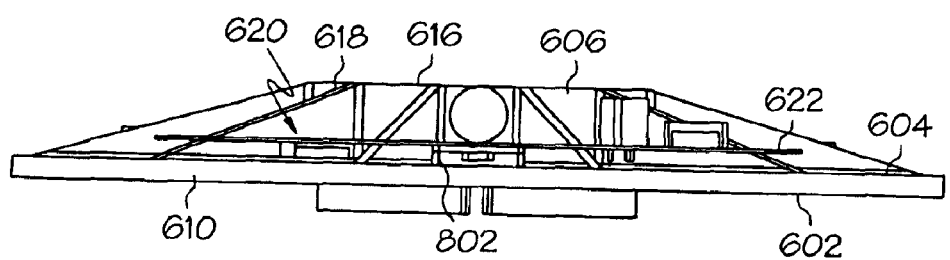

As shown more clearly in FIGS. 6 and 7, the housing assembly second end section 410 is generally circular in shape, though it will be appreciated that it could be made into any one of numerous other geometric shapes. The housing assembly second end section 410 has an inner surface 602, an outer surface 604, and a hub 606. A plurality of fastener apertures 608 are disposed adjacent to an outer periphery 610 of the end section 410. These apertures 608 each receive a fastener 502 (see FIG. 5) that are used to couple the end section 410 to the housing assembly central section 406. A central aperture 612 extends through the hub 606, through the end section outer surface 604, to the inner surface 602. As shown more clearly in FIG. 5, one set of the magnetic bearing hardware 320 is mounted within the central aperture 612, and is coupled to the housing assembly end section 410 via, for example, a plurality of fasteners.

A plurality of apertures 614 are also formed in an end surface 616 of the hub 606. These apertures 614 receive fasteners that are used to mount the motor/generator housing 412 to the housing assembly second end section 410. A plurality of structural fins or ribs 618 extend between the end section outer periphery 610 and the hub end surface 616, and provide added structural strength for the end section 410.

One or more control circuits 620 are also mounted on the housing assembly second end section 410. The control circuits 620 may include one or more of the gimbal controller 302, the magnetic bearing controller 304, and the motor/generator controller 306. Preferably, the control circuit 620 includes at least the motor/generator controller 306, but could also include either or both the magnetic bearing controller 304 and the gimbal controller 302.

The circuit components that make up the controller circuits 620 are preferably mounted on a circuit board 622, which is described more fully below, and which is in turn mounted on the housing assembly end section 410. It will be appreciated that only a few circuit components are shown in FIGS. 6–9, and that the present embodiment is not limited to the number or configuration shown. Rather, these exemplary components are shown for illustrative purposes only, and the skilled artisan will appreciate that the size, number, and configuration of the components may vary.

Figure 9:
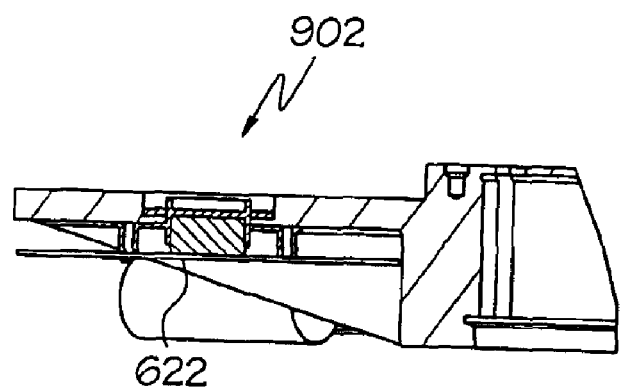
FIGS. 7–9 are front, side, and cross section views, respectively, of the housing end section shown in FIG. 6.

In the depicted embodiment, and as shown most clearly in FIG. 9, one or more power connectors 902 are used to electrically couple the circuit board 622 (and thus the controller circuits 620) to various components within the housing assembly 402. As noted above, the components within the housing assembly 402 to which the power connectors 902 are electrically coupled, include the motor-generator 332, and may additionally include the magnetic bearings 320. It will be appreciated that, although a single power connector 902 is shown, one or more additional power connectors 902 could be used to electrically couple the circuit board 622 to the various components and systems with the housing assembly 402.

Figure 10:
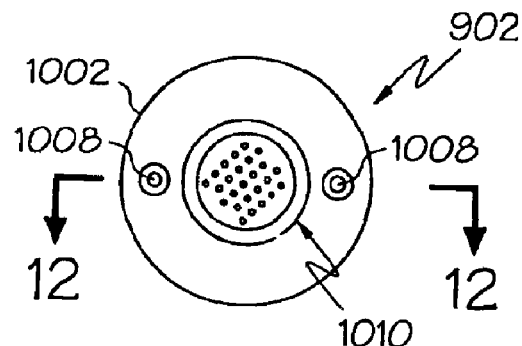
FIGS. 10–12 are top, side, and cross section views, respectively, of a power connector according to an exemplary embodiment of the present invention that may be mounted on the energy storage flywheel system housing show in FIGS. 6–9.
Figure 11:
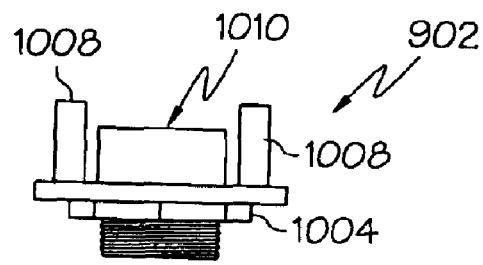
Figure 12:
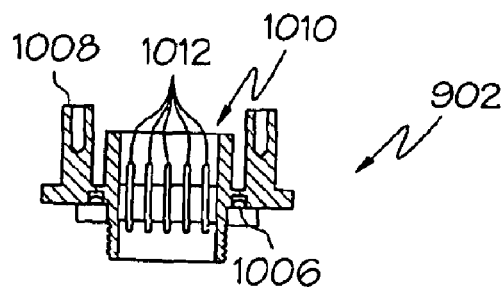
Figure 13:
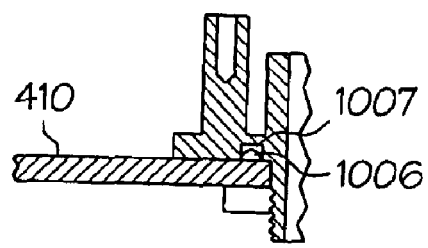
FIG. 13 is a cross section view of a section of the energy storage flywheel system housing showing the connection of the power connector of FIGS. 10–12 to the housing of FIGS. 6–9.

The power connector 902, a particular embodiment of which is shown in FIGS. 10–12, includes a main body 1002, an attachment nut 1004, and a seal 1006. The main body 1002 extends through the housing assembly second end section 410, and is held securely in place by the attachment nut 1004, which is threaded onto the main body 1002. The seal 1006 is positioned within a seal groove 1007 (see FIG. 13) formed in the main body 1002 and, as shown in FIG. 13, when the attachment nut 1004 is tightened sufficiently, hermetically seals the power connector 902 on the housing assembly second end section 410.

The circuit board 622 is both mechanically and electrically coupled to the power connector 902. Thus, the power connector 602 not only provides electrical communication between the circuit board 622 and one or more of the above-mentioned components and systems within the housing 410, it also provides some mechanical support for the circuit card 622. In the depicted embodiment, the circuit board 622 is mechanically coupled to the power connector 902 via a plurality of fasteners (not shown) that each thread into an internally threaded circuit board mount 1008 formed on the power connector main body 1002. In addition, as shown most clearly in FIG. 8, the flywheel housing end section 410 preferably includes support structure 802 for the circuit board 622. It will be appreciated that other ways of coupling the circuit board 622 to the power connector circuit board mounts 1008 such as, for example, a soldering or brazing process, could also be used.

Figure 14:
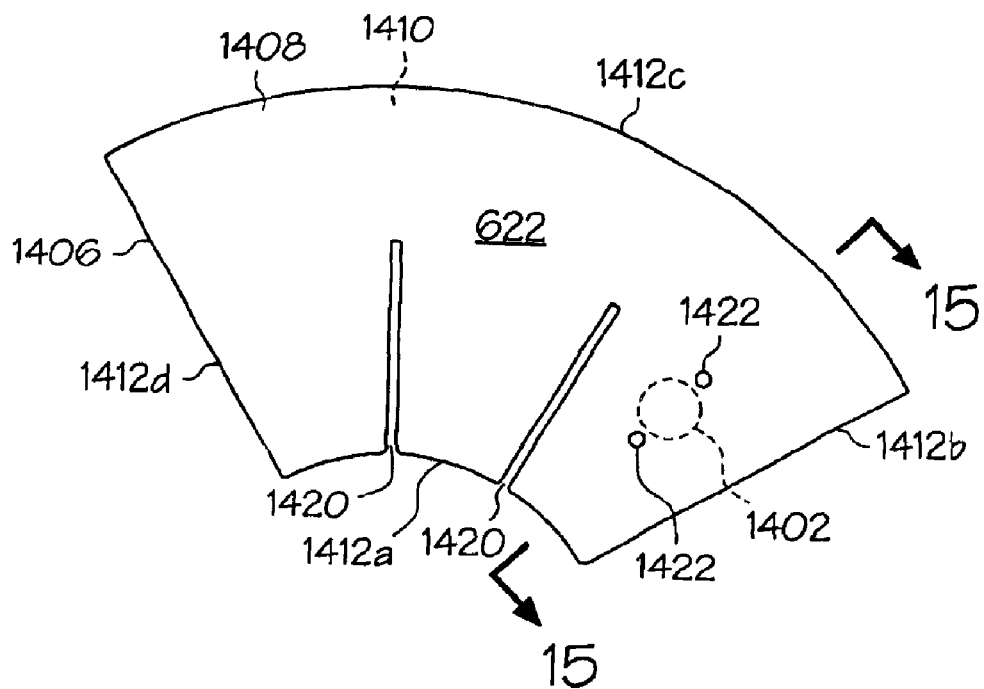
FIGS. 14 and 15 are top and cross section views, respectively, of a circuit board according to an exemplary embodiment of the present invention that may be mounted on the energy storage flywheel system housing show in FIGS. 6–9, and electrically coupled to the power connector of FIGS. 10–12.
Figure 15:
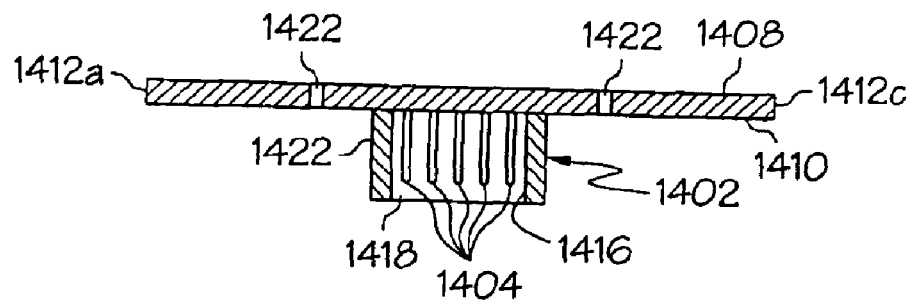

The circuit board 622 is electrically coupled to the power connector 902 using a plug assembly 1402 (see FIG. 14). More specifically, and with reference to FIGS. 9, 10, 12, 14, and 15, the power connector main body 1002 includes an electrical feedthrough 1010. The electrical feedthrough 1010 has a plurality of electrically conductive pins 1012 which are held in place, and are electrically insulated from one another, by a dielectric potting material such as, for example, diallyl phthalate. Electrical conductors from the motor/generator 302 and, in some embodiments, the magnetic bearings 322, are electrically coupled to one end of each pin 1012 by, for example, a soldering process. The other ends of these pins 1012 are configured to mate with female pin receptacles 1404 that are located in the plug assembly 1402.

The plug assembly 1402 is coupled to the circuit board 622. In the depicted embodiment, the circuit board 622 includes a main body 1406 that has an upper surface 1408, a lower surface 1410, and a plurality of side surfaces 1412a–d. In the depicted embodiment, the plug assembly 1402 is coupled to the circuit board lower surface 1410 and, with reference to FIG. 15, includes a main body 1414 that is dimensioned to fit within the power connector feedthrough 1010. The plug assembly main body 1414 includes an inner surface 1416 that forms a cavity 1418 in which each of the female pin receptacles 1404 is disposed. The female pin receptacles 1404 are electrically coupled to circuit runs (not shown) that traverse one or both surfaces 1408, 1410 of the circuit board 622 in a pattern to appropriately electrically couple the circuit components mounted thereon.

In addition to the plug assembly 1404, the circuit board 622 also preferably includes one or more slots 1420. Preferably, these slots 1420 are spaced and suitably dimensioned to accommodate the structural fins 618 on the housing assembly second end section 410. This configuration allows the circuit board 622 to be mounted fairly close to the housing assembly end section outer surface 604, which allows the housing assembly 402 to function as a heat sink for the circuitry mounted on the circuit board 622. The circuit board 622 also includes one or more apertures 1422 that are collocated with the power connector circuit board mounts 1008, and non-illustrated fasteners are then used to couple the circuit board 622 to the power connector 902.

The power connector 902 provides for easier assembly of each flywheel system 106 and, in combination with the circuit board 622, eliminates the use of high power cable runs from the motor/generator 332 to the motor/generator controller 306. Thus, the weight associated with each flywheel system 106 is reduced, and the flywheel housing assembly 402 may function as a Faraday cage, thereby shielding low power components, such as those that make up the controller 306, from unwanted noise. The power connector 902 also allows the electrical connections from the motor/generator 322 to be completed during flywheel system assembly, reducing time consuming connections to the controller. This configuration also allows the flywheel housing assembly 402 to act as a heat sink for the components on the circuit board 622, thereby reducing the number of heat sinks and, concomitantly, system weight.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel system comprising:

a housing assembly;

an energy storage flywheel rotationally mounted in the housing assembly;

a power connector extending at least partially through the housing assembly; and a controller circuit mounted on the housing assembly and electrically coupled to the power connector.

2. The system of claim 1, wherein the controller circuit is mounted on a circuit board.

3. The system of claim 2, wherein:
the housing assembly includes one or more structural fins extending from a surface thereof; and
the circuit board comprises one or more slots configured to receive the structural fins at least partially therein.

4. The system of claim 3, wherein the circuit board is supported by at least the power connector.

5. The system of claim 3 wherein:
the circuit board fiber comprises a main body having a first she, a second surface, and a plurality of side surfaces disposed between the first and second surface;
the slots are formed in the main body; and
the slots extend between the first and second surfaces, and further extend from a first one of the side surfaces a predetermined distance toward a second one of the side surfaces that is disposed opposite the first side spice.

6. The system of claim 5, wherein the circuit board her comprises a plug assembly coupled to the main body first surface.

7. The system of claim 6, wherein the plug assembly comprises:
a main body having an inner surface that forms a cavity in the main body;
a plurality of electrically conductive pins disposed within the cavity.

8. The system of claim 7, wherein each of the pins has an opening in an end thereof to receive another conductive pin therein.

9. The system of claim 5, further comprising:
one or more circuit components mounted on one of the circuit board first and second surfaces.

10. The system of claim 9, wherein the commit components are electrically configured as a motor/generator controller.

11. The system of claim 1, wherein the controller circuit is mounted at least partially on a printed circuit board, and wherein the connector comprises:
a main body adapted to extend at least partially through the energy storage flywheel housing;
an electrical feedthrough formed in the main body, the electrical feedthrough having one or more electrical conductors extending therethrough; and
one or more circuit board mounts extending from the main body, each circuit board mount adapted to couple to the printed circuit board.

12. The system of claim 11, wherein the main body has an outer surface, and wherein the connector further comprises:
a plurality of threads formed on at least a portion of the main body outer surface; and
a threaded attachment nut coupled to the main body outer surface via the threads formed thereon.

13. The system of claim 11, wherein the connector further comprises:
a seal groove formed in the main body; and
a seal disposed at least partially in the groove and positioned between the connector main body and the housing assembly.

14. The system of claim 11, wherein each circuit board mount includes an opening that defines an internal surface having threads formed on at least a section thereof, and wherein the system further comprises:
one or more threaded fasteners extending through the printed circuit board and into the circuit board mounts, whereby the printed circuit board is coupled thereto.

15. The system of claim 11, wherein the one or more electrical conductors comprise:
a plurality of electrically conductive pins; and
a dielectric material electrically insulating the pins from one another.

16. The system of claim 1, further comprising:
a motor/generator coupled to the energy storage flywheel and configured to selectively operate in either (i) a motor mode, whereby electrical energy is converted to rotational energy and supplied to the energy storage flywheel, or (ii) a generator mode, whereby rotational energy is received from the energy storage flywheel and converted to electrical energy,
wherein the controller circuit includes a motor/generator controller electrically coupled to the motor/generator and operable to selectively configure the motor/generator to operate in either the motor mode or the generator mode.

17. The system of claim 1, further comprising:
one or more magnetic bearings mounted in the housing and configured to rotationally mount the energy storage flywheel,
wherein the controller circuit includes a magnetic bearing controller electrically coupled to each magnetic bearing.

18. A power connector adapted for mounting on an energy storage flywheel system housing, the connector comprising:
a main body adapted to extend at least partially through the energy storage flywheel housing;
an electrical feedthrough formed in the main body, the electrical feedthrough having one or more electrical conductors extending therethrough; and
one or more circuit board mounts extending from the main body, each circuit board mount adapted to couple to a printed circuit board.

19. The connector of claim 18, wherein the main body has an outer surface, and wherein the connector further comprises:
a plurality of threads formed on at least a portion of the main body outer surface; and
a threaded attachment nut coupled to the main body outer surface via the threads formed thereon.

20. The connector of claim 18, further comprising:
a seal groove formed in the main body, the seal groove adapted to receive a seal therein.

21. The connector of claim 18, wherein each circuit board mount includes an opening defining an internal surface having threads formed on at least a section thereof, whereby the printed circuit board may be coupled thereto using threaded fasteners.

22. The connector of claim 18, wherein the one or more electrical conductors comprise:
a plurality of electrically conductive pins; and
a dielectric material electrically insulating the pins from one another.

23. A circuit board adapted to mount on an energy storage flywheel housing having one or more structural fins, the circuit card comprising:
a main body having a first surface, a second surface, and a plurality of side surfaces disposed between the first and second surface;

a plurality of slots formed in the main body, each slot extending between the first and second surfaces, and further extending from a first one of the side surfaces a predetermined distance toward a second one of the side surfaces that is disposed opposite the first side surface, wherein each slot is dimensioned to at least partially surround a section of one of the structural fins on the energy storage flywheel housing.

24. The circuit board of claim 23, further comprising:
a plug assembly coupled to the main body first surface.

25. The circuit board of claim 24, wherein the plug assembly comprises:
a main body having an inner surface that forms a cavity in the main body;
a plurality of electrically conductive pins disposed within the cavity.

26. The circuit board of claim 25, wherein each of the pins has an opening in an end thereof to receive another conductive pin therein.

27. The circuit board of claim 23, further comprising:
one or more circuit components mounted on one of the first and second surfaces.

28. The circuit board of claim 27, wherein the circuit components mounted on the circuit card are electrically configured as a motor/generator controller.

* * * * *

UNITED STATES PATENT AND TRADEMARK OFFICE
CERTIFICATE OF CORRECTION

PATENT NO. : 6,882,072 B2
APPLICATION NO. : 10/4611537
DATED : April 19, 2005
INVENTOR(S) : Wingett et al.

Page 1 of 1

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Column 9, line 11, "fiber" should be changed to --further--;
Column 9, line 12, "she" should be changed to --surface--;
Column 9, line 18, "spice" should be changed to --surface--;
Column 9, line 19, "her" should be changed to --further--;
Column 9, line 34, "commit" should be changed to --circuit--.

Signed and Sealed this

Twenty-seventh Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,882,072 B2 | Page 1 of 1 |
| APPLICATION NO. | : 10/461537 | |
| DATED | : April 19, 2005 | |
| INVENTOR(S) | : Wingett et al. | |

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Column 9, line 11, "fiber" should be changed to --further--;
Column 9, line 12, "she" should be changed to --surface--;
Column 9, line 18, "spice" should be changed to --surface--;
Column 9, line 19, "her" should be changed to --further--;
Column 9, line 34, "commit" should be changed to --circuit--.

This certificate supersedes Certificate of Correction issued March 27, 2007.

Signed and Sealed this

Seventeenth Day of April, 2007

JON W. DUDAS
*Director of the United States Patent and Trademark Office*